United States Patent [19] [11] 4,218,307

McDaniel [45] Aug. 19, 1980

[54] HYDROCARBON CRACKING CATALYST

[75] Inventor: Carl V. McDaniel, Laurel, Md.

[73] Assignee: W. R. Grace & Co., New York, N.Y.

[21] Appl. No.: 2,139

[22] Filed: Jan. 9, 1979

Related U.S. Application Data

[60] Division of Ser. No. 822,867, Aug. 8, 1977, abandoned, and a continuation-in-part of Ser. No. 741,326, Nov. 12, 1976, abandoned, which is a continuation-in-part of Ser. No. 571,177, Apr. 24, 1975, abandoned.

[51] Int. Cl.$^2$ .......................... C10G 11/02; B01J 29/08
[52] U.S. Cl. .................................. 208/120; 252/455 Z
[58] Field of Search ...................... 252/455 Z; 208/120

[56] References Cited

U.S. PATENT DOCUMENTS

| | | | |
|---|---|---|---|
| 3,591,488 | 7/1971 | Eberly, Jr. et al. | 208/111 |
| 3,957,623 | 5/1976 | McDaniel | 252/455 Z |

*Primary Examiner*—Carl F. Dees
*Attorney, Agent, or Firm*—Arthur P. Savage

[57] ABSTRACT

A zeolite containing hydrocarbon cracking catalyst characterized by exceptionally high catalytic acitivity, superior coke selectivity and relatively low rate earth content. The catalyst is prepared by combining into a suitable matrix a zeolite prepared by a combination of thermal stabilization, de-alumination and rare earth ion exchange.

5 Claims, No Drawings

HYDROCARBON CRACKING CATALYST

This is a division of application Ser. No. 822,867, filed Aug. 8, 1977, now abandoned.

This application is a continuation-in-part of my application Ser. No. 741,326, filed Nov. 12, 1976 now abandoned, which is a continuation of my application Ser. No. 571,177, filed Apr. 24, 1975, now abandoned.

BACKGROUND OF THE INVENTION

The use of zeolite promoted cracking catalysts is well known. U.S. Pat. No. 3,140,249 to Plank et al is typical of the early patents in this area. These patents generally disclose the use of a faujasitic type zeolite having a silica to alumina ratio of about 3 to 6 that has exchanged therein a fairly substantial quantity of rare earth oxides, distended in a matrix such as silica, silica-alumina, silica-zirconia, alumina, et. The preferred catalysts comprise the rare earth exchange faujasitic zeolites in a silica-alumina matrix.

Continuing efforts have been made to improve these catalysts by making them more stable, more resistant to high temperature and more economical. One of the recurring problems is the use of the relatively rare and quite costly rare earth salts in the preparation of these catalysts. The process of the instant application prepares a stable active zeolite containing catalyst that minimizes the amount of rare earth contained therein.

BRIEF DESCRIPTION OF THE INVENTION

I have found that an exceptionally stable and active catalyst can be prepared by suspending a novel thermally stabilized rare-earth exchanged Type Y zeolite with a silica to alumina ratio of greater than 7 to 20 in a suitable matrix. The zeolite is present as about 5 to 20 percent, preferably about 10 to 30 percent of the composite and contains less than 10 percent of rare earth.

DETAILED DESCRIPTION OF THE INVENTION

The first step in our process is the preparation of the novel zeolite having a silica to alumina ratio of greater than 7 to about 20. The zeolite is obtained by acid treating a zeolite similar to the PCY zeolite which is described in U.S. Pat. No. 3,595,611 to McDaniel et al. Briefly, the process comprises acid treating a Type Y faujasitic type zeolite that has been subjected to an ion exchange to reduce the $Na_2O$ content to less than 4 percent, preferably 2.5 to 3 percent by weight, followed by exchange with rare earth ions to impart a rare earth oxide content of about 0.5 to 4 percent by weight, and heating to a temperature of about 700° to 1600° F. This stabilized zeolite is then treated with a dilute mineral acid to remove a portion of the alumina and shift the silica to alumina ratio from about 3.5 to 6 to greater than 7 to about 20. The acid treated zeolite is then further exchanged with metal ions, preferably magnesium and rare earth ions, to increase the metal oxide content to a level of 1 to 10 percent by weight, that is, adding an additional 0.5 to 9.5 percent by weight metal oxide by further exchange.

The critically important features of this process are the preparation of the stabilized zeolite by the combination of ion exchange and calcination steps followed by the acid treatment to remove a portion of the alumina. The product recovered from this treatment is a zeolite having a high degree of stability and relatively low ion exchange capacity.

The next step of the process is incorporation of the rare earth or other cations into the partially dealuminated zeolite by ion exchange. This is accomplished by conventional ion exchange techniques. Because of the low ion exchange capacity the amount of rare earth or other ions in the zeolite is relatively low, generally in the order of less than 10 percent dry weight.

Cracking catalysts normally contain rare earths exchanged into the zeolite. However, other cations such as magnesium also give satisfactory results.

In the next step of the preferred process of the invention the zeolite in the rare earth or other cation form is distended into an inorganic oxide matrix. In this manner the zeolite crystals are suspended in and distributed throughout the matrix. The catalyst-matrix suspension can be readily prepared by dispersing the zeolite in the rare earth form in a suitable siliceous sol and gelling the sol by various means. In addition, the zeolite may be dispersed in a co-gel of silica and an oxide of a second metal. Examples of suitable co-gels include silica-alumina, silica-magnesia, silica-zirconia, silica-titania, as well as tertiary combinations such as silica-alumina-zirconia, silica-alumina-magnesia, silica-magnesia-zirconia, ect. The preferred co-gels include silica-alumina and silica-magnesia, with silica-alumina being particularly preferred. In addition, the matrix may contain a considerable amount of clay that is normally added to the sodium silicate solution prior to forming the co-gel with alumina, magnesia, etc.

These gels and co-gels will generally comprise a major portion of silica and a minor portion of the other oxide or oxides. The silica content of the siliceous gel or co-gel matrix will generally be in the range of 55 to 100 weight percent, preferably 60 to 90 percent, with the other metal oxides in the range of 5 to 45 weight percent, preferably 10 to 40 weight percent.

If clay is added as a component of the matrix it is only present in the amount of 10 to 70 percent.

The silica-alumina hydrogels can be produced by any number of known methods. For example, a hydrous precipitate of silica can be prepared by mixing the solution of sodium silicate with an acid such as sulfuric acid or with carbon dioxide to produce a slurry having a pH below 9, usually below 7, A solution of an aluminum salt such as aluminum sulfate, for example, is then added, and the pH of the mixture is adjusted to above 4 by the addition of an alkaline material such as ammonia in order to precipitate the alumina.

As pointed out above, in addition it is contemplated that the matrix can comprise natural or synthetic clays such as kaolin type clays, montmorillonite, bentonite, halloysite, etc.

The zeolite-matrix compositions are prepared by intimately admixing the aforesaid described zeolite with the siliceous hydrogel, clay or mixtures thereof and thereafter obtaining a composite product comprising the zeolite component uniformly distributed throughout and suspended in the inorganic oxide matrix.

The zeolite component of the catalyst is normally present in the amount of about 5 to 50 percent, preferably about 10 to 30 percent.

The so-called PCY zeolite described in U.S. Pat. No. 3,595,611 used in the practice of this invention is prepared by treating a Type Y zeolite having a silica to alumina ratio of about 3.5 to 5 with a combination of ammonium ion exchange and metal ion exchange. The zeolite is first exchanged with an ammonium salt solution to reduce the $Na_2O$ content to below about 4 percent by weight, and preferably 2.5 to 3.5 percent by weight. The zeolite is then filtered and the cake returned to the solution of a salt containing rare earth or other cations sufficient to provide 0.5 to 4 percent rare earth oxide or the equivalent amount of other cations such as magnesium to the zeolite. The product is then filtered, washed free of excess salt and heated at a temperature of about 700° to 1600° F. The product is then cooled and optionally exchanged with an ammonium salt solution to reduce the $Na_2O$ content to less than 1 percent.

Having described the basic aspect of my intention, the following examples are given to illustrate specific embodiments thereof.

EXAMPLE 1

A PCY zeolite was prepared as follows: 100 g sodium Type Y zeolite (NaY) having a silica to alumina ratio of 4.7 was exchanged twice with ammonium sulfate solution to lower the $Na_2O$ content to about 3 percent by weight. The ammonium exchanged zeolite was then exchanged with a rare-earth chloride salt solution which contained 3.5 rare earth chloride dissolved in 1000 g of water. This zeolite was washed with water and calcined at 1400° F. The calcined zeolite was then further exchanged with ammonium sulfate solution to obtain a PCY zeolite which contained 0.2 percent by weight $Na_2O$ and 3.35 percent by weight rare-earth oxides.

A 100 gram sample of this zeolite was treated with a dilute (0.1) normal solution of nitric acid at a temperature of 30°0 C. for a period of 4 hours. The zeolite was filtered and again treated with nitric acid. A total of 0.75 moles of nitric acid was used in this treatment. The zeolite was then recovered, washed free of dissolved salts and dried. The analysis of the zeolite in weight percent was as follows: $Na_2O$ less than 0.2; $SiO_2$ 83.2; $Al_2O_3$ 12.6; rare earth oxides 1.5.

The zeolite was prepared as a catalyst component by dry mixing the zeolite with a semi-synthetic commercial cracking catalyst having a low activity. The semi-synthetic catalyst contained 60 percent silica-alumina and 40 percent clay. The physical blend of the two components was formed into pills and the catalytic activity was determined using a microactivity test. In this test the samples to be tested are placed in a reactor and heated to a temperature of 900° F. in the presence of a West Texas Gas Oil Feed. The catalyst oil ratio was 5.88, and the weight hourly space velocity was 16. In this run the catalyst prepared to contain 10 percent of our novel zeolite, designated catalyst C, was compared with a semi-synthetic catalyst that contained no zeolite, designated Catalyst B, and with a catalyst containing 10 percent of the ultra stable faujasite, designated catalyst A. The data collected in the series of runs is set cut in the table below.

TABLE I

| Catalyst | B | A | C |
|---|---|---|---|
| Conversion volume percent | 29.08 | 46.82 | 61.54 |
| $H_2$ weight percent | 0.054 | 0.045 | 0.059 |
| $C_1$ weight percent | 0.099 | 0.092 | 0.146 |
| $C_2$ weight percent | 0.104 | 0.060 | 0.211 |
| $C_3$ volume percent | 0.36 | 0.44 | 0.88 |
| $C_4$ volume percent | 7.70 | 9.34 | 11.7 |
| $C_5$ + gasoline volume percent | 21.90 | 38.64 | 52.16 |
| Coke weight percent | 1.36 | 1.14 | 1.42 |

It is apparent from a review of this data that the catalyst of the instant application has a good conversion and a high conversion to gasoline with a small conversion to coke. This result was achieved even though the catalyst contained only 0.1 percent rare earth oxide.

EXAMPLE 2

A run was completed in which the amount of rare earch oxide in the zeolite was increased by an additional rare earth exchange.

A total of 25 grams of the zeolite described in Example 1 was exchanged with a rare earth chloride solution containing 10 grams of rare earth chloride (as $Re_2O_3$) per 100 ml using ratios of zeolite to rare earth to water of 1 to 1 to 10. The exchange was carried out for 30 minutes at a temperature of about 90° C. The zeolite was washed free of dissolved salts and dried. The analysis of the zeolite in weight percent was as follows: $Na_2O$—0.1; rare earth oxide—7.1; alumina—10.2; silica—82.6. A physical blend of 10 percent of the zeolite and 90 percent of the low activity commercial semi-synthetic cracking catalyst was prepared and pills were formed from this mixture. The microactivity of this catalyst (designated Catalyst D) was compared with the catalysts designated C of Example 1. The results of this comparison are set out in the table below.

TABLE II

| Catalyst | C | D |
|---|---|---|
| Conversion volume percent | 61.54 | 71.93 |
| $H_2$ weight percent | 0.059 | 0.052 |
| $C_1$ weight percent | 0.146 | 0.243 |
| $C_2$ weight percent | 0.211 | 0.260 |
| $C_3$ volume percent | 0.88 | 1.22 |
| $C_4$ volume percent | 11.7 | 12.72 |
| $C_5$ + gasoline volume percent | 52.16 | 60.56 |
| Coke weight percent | 1.42 | 1.89 |

It is apparent from review of these data which compare catalyst C of Example 1 with catalyst D of this Example 2, that there is a substantial improvement in conversion and a substantial improvement in gasoline recovery when the amount of rare earth in the zeolite is increased from 1.5 to 7.1 percent.

EXAMPLE 3

In this example the product of Example 1 was given an additional exchange with a magnesium chloride solution.

A total of 25 grams of the zeolite was exchanged with a magnesium chloride solution containing 10 grams of magnesium chloride per 100 ml. The zeolite to magnesium chloride to water ratios were 1:1:10. The zeolite was washed free of excess salt and dried. The analysis of the zeolite in weight percent was as follows: $Na_2O$—1.0; $Re_2O_3$—1.5; $Al_2O_3$—10.4; $SiO_2$—87; MgO—1.0. A catalyst was prepared from this zeolite by physically blending 10 percent of the zeolite and 90 percent of a low activity commercial semi-synthetic cracking catalyst. The mixture was formed into pills and the microactivity test was carried out under the same conditions as in Example 1. The product of this run was identified as catalyst E and was compared with the Catalyst A of Example 1. The data collected in this run is set out in the table below.

TABLE III

| Catalyst | C | E |
|---|---|---|
| Conversion volume percent | 61.54 | 71.68 |
| $H_2$ weight percent | 0.059 | 0.062 |
| $C_1$ weight percent | 0.146 | 0.195 |
| $C_2$ weight percent | 0.211 | 0.253 |
| $C_3$ volume percent | 0.88 | 1.27 |
| $C_4$ volume percent | 11.7 | 12.76 |
| $C_5$ + gasoline volume percent | 52.16 | 60.43 |
| Coke weight percent | 1.42 | 1.39 |

It is apparent from the data that a catalyst containing as little as 0.1 percent magnesium and 0.15 percent rare earth gives excellent conversions.

What is claimed is:

1. In an improved method for catalytically cracking hydrocarbons wherein the production of coke is minimized, the improvement comprising contacting a hydrocarbon feedstock with a catalyst comprising a catalytically active, coke selective zeolite admixed with an inorganic oxide matrix, and recovering cracked hydrocarbons of lower molecular weight, said zeolite being prepared by:

a. exchanging a sodium Y zeolite having a silica to alumina ratio of about 3.5 to 6 with an ammonium salt to reduce the $Na_2O$ content thereof to less than 4 percent by weight;

b. exchanging said zeolite with a solution of rare earth ions to provide a rare earth content expresses as rare earth oxide of about 0.5 to 4 percent by weight;

c. washing said zeolite to remove excess salts;

d. heating said zeolite to a temperature of about 700° to 1600° F.;

e. contacting said zeolite with a dilute solution of a mineral acid to remove alumina therefrom and thereby increase the silica to alumina ratio to a range of about 7 to 20;

f. exchanging the zeolite of step e. with a solution of metal ions selected from the group consisting of rare earth and magnesium ions to provide a total metal ion content expressed as metal oxides of from about 1 to 10 percent by weight.

2. The method of claim 1 wherein said dilute acid solution is dilute nitric acid.

3. The method of claim 1 wherein said catalyst contains from about 5 to 50 percent by weight of said zeolite.

4. The method of claim 3 wherein the inorganic oxide matrix is selected from the group comprising clay, silica, alumina and silica-alumina hydrogels.

5. The method of claim 1 wherein said zeolite contains about 1.5 percent by weight rare-earth oxide and about 1 percent by weight magnesium oxide.

* * * * *